United States Patent [19]

Kanda

[11] Patent Number: 4,920,293
[45] Date of Patent: Apr. 24, 1990

[54] SQUIRREL-CAGE INDUCTION MOTOR

[75] Inventor: Akio Kanda, Nagasaki, Japan

[73] Assignee: Mitsubishi Denki Kabushiki Kaisha, Tokyo, Japan

[21] Appl. No.: 282,267

[22] Filed: Dec. 9, 1988

[30] Foreign Application Priority Data

Dec. 10, 1987 [JP] Japan .................. 62-311074

[51] Int. Cl.$^5$ ............................................. H02K 17/00
[52] U.S. Cl. .................................... 310/116; 310/166; 310/191; 318/538
[58] Field of Search ............... 310/112, 114, 116, 122, 310/166, 191, 209, 115, 212; 318/437, 538, 539

[56] References Cited

U.S. PATENT DOCUMENTS 3,586,938  6/1971  Le Gall .............................. 318/166
4,785,213  11/1988 Satake ................................ 310/114

FOREIGN PATENT DOCUMENTS 27-4357   10/1957  Japan .
59-191461 10/1984  Japan .
62-260590 11/1987  Japan .

Primary Examiner—Patrick R. Salce
Assistant Examiner—Judson H. Jones
Attorney, Agent, or Firm—Burns, Doane, Swecker & Mathis

[57] ABSTRACT

A squirrel-cage induction motor having a sectional stator comprising a first stator fixedly held on a frame, and a second stator circumferentially movably supported on the frame beside the first stator. The second stator is displaced relative to the first stator through a gear mechanism by a control motor through an angle meeting operating conditions of the squirrel-cage motor required by the load. Thus, the squirrel-cage induction motor has satisfactory response characteristics, and the second stator can manually be turned in case the component of the mechanism for driving the second stator, for example, the control motor, malfunctions.

5 Claims, 5 Drawing Sheets

SQUIRREL-CAGE INDUCTION MOTOR

BACKGROUND OF THE INVENTION

1. Field of the Invention

The present invention relates to a squirrel-cage induction motor and, more particularly, to improvements in the method of controlling the starting current and speed adjustment for a squirrel-cage induction motor.

2. Description of the Prior Art

In the squirrel-cage induction motor, in general, three-phase ac current is supplied to the stator windings to generate a rotating magnetic field, and the interaction of the rotating magnetic field and the current flowing through the squirrel-cage conductors of the rotor generates a torque, which drives the rotor core for rotation.

A star-delta switching starter, a reactor starter and a starting compensator are conventional starting current control means for controlling the starting current of the squirrel-cage induction motor. However, these conventional starting current control means are merely capable of stepped control of the starting current and, once set, the desired starting current cannot be changed.

A secondary resistance control method employing a wound-rotor induction motor is a starting current control means capable of continuously controlling the starting current. However, requiring a wound rotor, the secondary resistance control method makes the construction of the motor complicated, hence, the motor is expensive, needs additional components such as a metallic resistor or a liquid resistor, and a controller for regulating the resistor. Furthermore, the secondary resistance control method suffers from a significant power loss in the resistor.

Improving the characteristics of the induction motor so that the induction motor can be started by a low starting current without using any special starter is another starting current control means. However, reduction in the starting current affects the torque characteristics of the induction motor adversely and deteriorates the operating characteristics of the induction motor. Accordingly, the starting current can be suppressed, at the lowest, to a starting current on the order of 350 to 400% of the rated current. In this case, a transformer of a power capacity several times the working power must be installed to suppress voltage drop of the transformer.

The applicant of the present invention previously proposed a squirrel-cage induction motor comprising a stator divided into two portions disposed side by side, and squirrel-cage rotor disposed opposite to the stator, in which the currents flowing through the squirrel-cage windings are suppressed to control the starting current continuously over a wide range by shifting the relative position of the two portions of the stator in circumferential directions to shift the phase of the electromotive forces induced in the squirrel-cage windings.

FIG. 1 shows a squirrel-cage induction motor previously proposed by the applicant of the present invention in Japanese Patent Laid-open (Kokai) No. 59-191461. Shown in FIG. 1 are brackets 1, bearings 2, a rotary shaft 3 supported in the bearings 2 on the brackets 1, a rotor core 4 fixedly mounted on the rotary shaft 3, rotor conductors 5 provided on the rotor core 4, end rings 6 provided respectively at the opposite ends of the rotor conductors 5 and shorting the ends of the rotor conductors 5 to form squirrel-cage windings, a frame 9, a first stator A fixed to the frame 9 and having stator windings 8A, a second stator B having stator windings 8B and mounted on the frame 9 so as to be turned in circumferential directions, slide rings 10 attached to the circumference of the second stator B, guide rings 11 attached to the inner surface of the frame 9 and respectively slidably receiving the slide rings 10 therein, a turning rod 12 fixed to the second stator B so as to project from the circumference of the frame 9, a hydraulic actuator 13 comprising a piston connected to the turning rod 12, a cylinder unit 15 receiving the piston 14 therein for axial movement. Working fluid is supplied through either of inlet ports 16 and 17 into the cylinder unit 15 to turn the second stator B in either circumferential direction through the piston 14 and the turning rod 12.

The second stator B can be turned within an angular range corresponding to one pole pitch of magnetic poles produced by supplying a three-phase alternating current to the windings.

Three phase alternating currents are supplied to the first stator A and the second stator B so that rotating magnetic fields of the same rotating direction are produced by the first stator A and the second stator B. Then, as shown in FIG. 2, a current $I_A$ induced by the rotating magnetic field of the first stator A and a current $I_B$ induced by the rotating magnetic field of the second stator B flow through the squirrel-cage windings. When the two stators A and B are positioned so that the poles produced by the three-phase alternating currents are in the same phase, the currents $I_A$ and $I_B$ are the same in magnitude and the direction of flow as shown in FIG. 2 and a resultant current $I_C$ flows through the squirrel-cage windings of the rotor.

When the second stator B is shifted relative to the first stator A in the circumferential direction by an angle corresponding to half the pole pitch, currents $I_A$ and $I_B$ as shown in FIG. 3 flow through the squirrel-cage windings and thereby a reduced and deformed resultant current $I_C$ as shown in FIG. 3 flows through the squirrel-cage windings of the rotor.

When the second stator B is shifted relative to the first stator A in the circumferential direction by an angle corresponding to one pole pitch, currents $I_A$ and $I_B$ as shown in FIG. 4 flow through the squirrel-cage windings, in which the currents $I_A$ and $I_B$ cancel each other and hence the resultant current $I_C$ is approximately zero.

Accordingly, the squirrel-cage induction motor has torque-speed characteristics as shown in FIG. 5(a) and current-speed characteristics as shown in FIG. 5(b). Torques $T_1$ to $T_4$ in FIG. 5(a) correspond respectively to starting currents $I_1$ to $I_4$ in FIG. 5(b).

This known squirrel-cage induction motor thus constructed has problems that is difficult to control the relation between the displacement of the second stator and the characteristics required by load, the response characteristics is unsatisfactory, the squirrel-cage induction motor cannot be incorporated into an automatic control system because the second stator cannot manually be shifted for phase control when the hydraulic mechanism malfunctions.

SUMMARY OF THE INVENTION

Accordingly, it is an object of the present invention to provide a squirrel-cage induction motor comprising a fixed first stator, a movable second stator, and a braked motor interlocked through a gear mechanism with the second stator to shift the second stator easily and rapidly relative to the first stator according characteristics required by load.

It is another object of the present invention to provide a squirrel-cage induction motor capable of being incorporated into an automatic control system, comprising a fixed first stator, a movable second stator, and a braked motor for shifting the second stator relative to the first stator, in which the second stator can manually be operated.

To achieve the objects of the invention, the present invention provides a squirrel-cage induction motor comprising a squirrel-cage rotor, a fixed first stator, a rotatable second stator, a segmental gear mounted on the circumference of the second stator, a braked motor interlocked through a gear mechanism including the segmental gear with the second stator to turn the second rotor, and a control circuit which operates conditions required by load to provide a command signal representing an angle of turning the second stator in the normal or reverse direction to drive the braked motor so that the second stator is turned through the angle specified by the command signal through the gear mechanism by the braked motor.

BRIEF DESCRIPTION OF THE DRAWINGS

The above and other objects, features and advantages of the present invention will become apparent from the following description taken in conjunction with the accompanying drawings, in which.

DETAILED DESCRIPTION OF THE PREFERRED EMBODIMENTS

Figure 1:
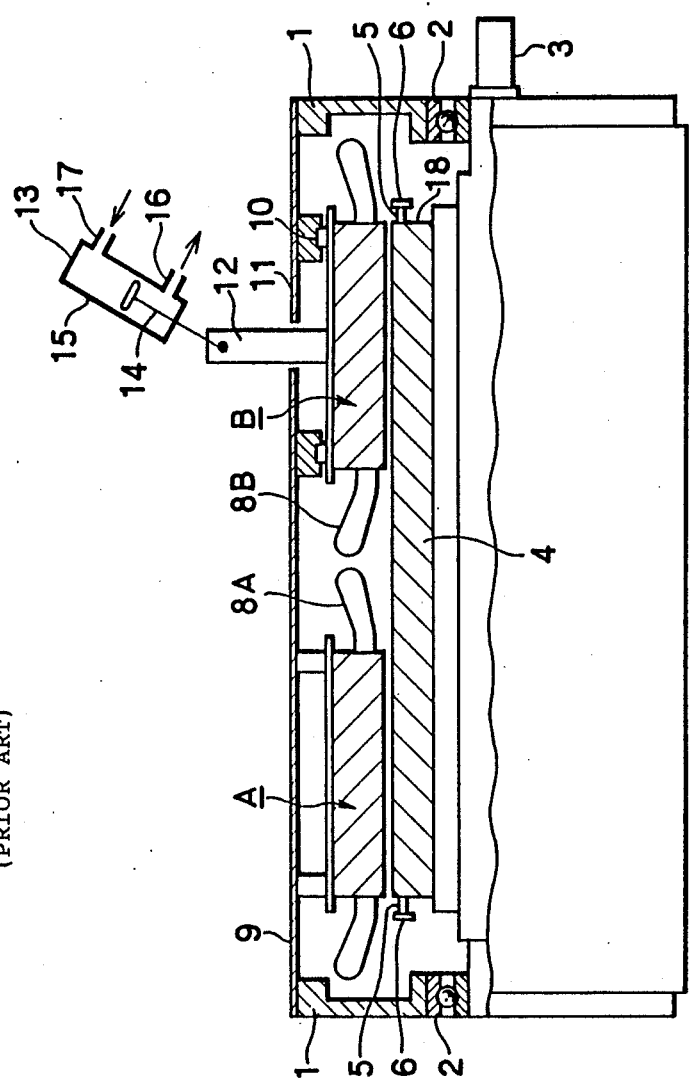
FIG. 1 is a longitudinal sectional view of a conventional squirrel-cage induction motor.
Figure 2:
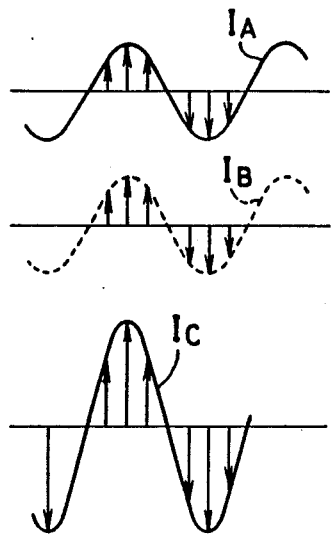
FIG. 2 is a graph of assistance in explaining a current induced in the squirrel-cage windings when the first and second stators are positioned in the same phase in the squirrel-cage induction motor.
Figure 3:
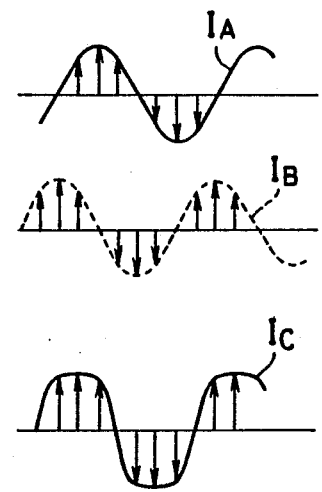
FIG. 3 is a graph of assistance in explaining a current induced in the squirrel-cage windings when the second stator is shifted relative to the first stator by half the pole pitch in a circumferential direction in the squirrel-cage induction motor of FIG. 1.
Figure 4:
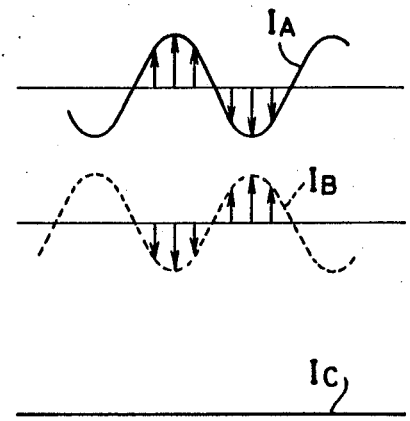
FIG. 4 is a graph of assistance in explaining a current induced in the squirrel-cage windings when the second stator is shifted relative to the first stator by one pole pitch in a circumferential direction in the squirrel-cage induction motor of FIG. 1.
Figure 5:
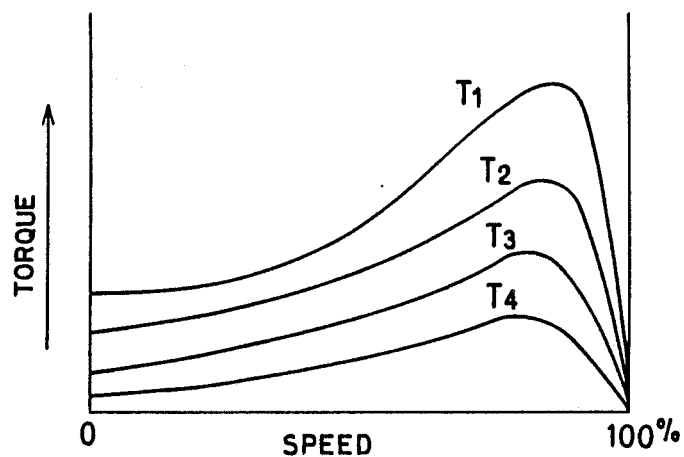
FIG. 5(a) is a graph showing the torque-speed characteristics of the squirrel-cage induction motor of FIG. 1.
FIG. 5(b) is a graph showing the current-speed characteristics of the squirrel-cage induction motor of FIG. 1.
Figure 5:
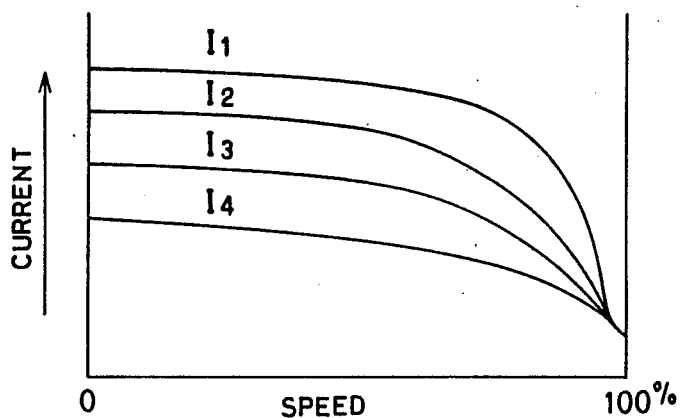

A squirrel-cage induction motor in a preferred embodiment according to the present invention will be described hereinafter with reference to the accompanying drawings, in which parts like or corresponding to those described previously with reference to FIG. 1 are denoted by the same reference numerals and the description thereof will be omitted.

Figure 6:
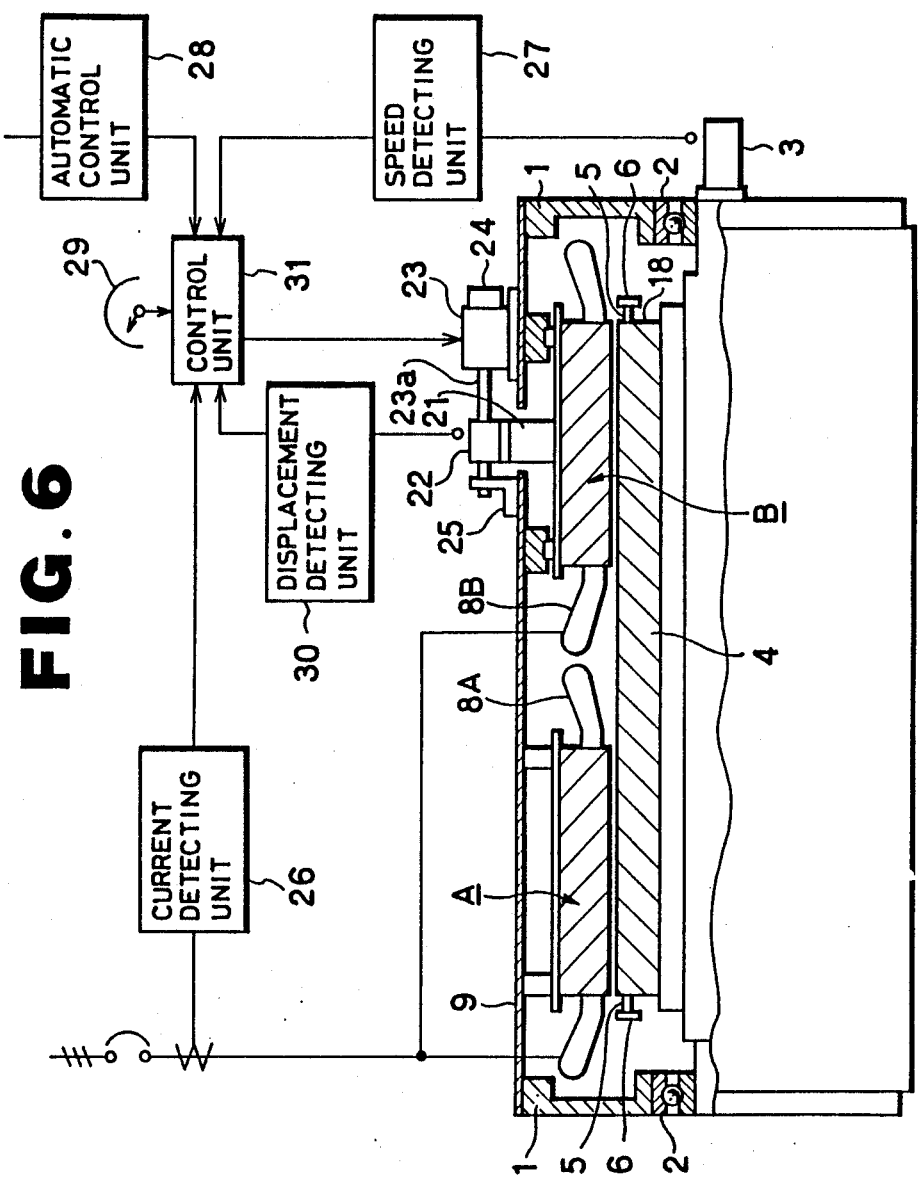
FIG. 6 is a longitudinal sectional view of a squirrel-cage induction motor in a preferred embodiment according to the present invention.
Figure 7:
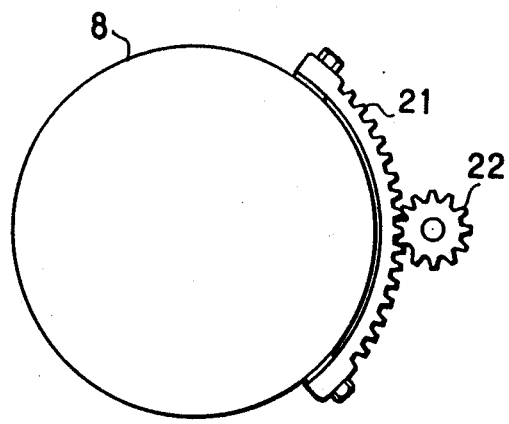
FIG. 7 is a front elevation of a gear mechanism for turning the second stator of the squirrel-cage induction motor of FIG. 6.

Referring to FIGS. 6 and 7, a segmental gear 21 is extended along the circumference of a second stator B in a semicircular aspect and is fixed to the circumference of the second stator B. A pinion 22 fixed to the output shaft 23a of a control motor 23 is in mesh with the segmental gear 21. The control motor 23 is fixedly mounted on the circumference of a frame 9. The output shaft 23a of the control motor 23 has one end (the left-hand end as viewed in FIG. 6) supported on a bearing pedestal 25 mounted on the circumference of a frame 9, and the other end (the right-hand end as viewed in FIG. 6) interlocked with a brake device 24.

The control motor 23 is controlled by a control unit 31. The control unit 31 receives the output signals of a current detecting unit 26 for detecting the working current of the squirrel-cage induction motor (hereinafter referred to simply as "induction motor"), a speed detecting unit 27 for detecting the operating speed of the induction motor, an automatic control signal unit 28 for providing control signals corresponding to control signals provided by a system incorporating the induction motor, an operating mode setting unit 29 for setting the operating mode of the induction motor, and a displacement detecting unit 30 for measuring the displacement of the second stator B relative to a first stator A, and controls the control motor 23 on the basis of those input signals to shift the second stator by a fixed angle. When the second stator B needs to be held fixed at a position, the control unit 31 applies the brake device 24.

Next, the operation will be described. In starting the induction motor, the control unit 31 controls the control motor 23 so that the second stator B is shifted relative to the first stator A by an angle corresponding to one pole pitch such as the maximum displacement to supply a minimum starting current to the induction motor. Since the starting current is small, hence, the starting torque of the induction motor is small, the load, such as a pump or a fan, is accelerated gradually.

When the working current of the induction motor detected by the current detecting unit 26 is higher than a set value, the control unit 31 gives a control signal to reduce the working current, namely, to reduce the operating speed of the induction motor, to the control motor 23, and then the control motor 23 turns the second stator B so that the displacement of the second stator relative to the first stator A is increased.

When the operating speed of the induction motor detected by the speed detecting unit 27 deviated from the set speed, the deviation of the operating speed of the induction motor is detected by the control unit 31 through the comparison of a voltage corresponding to the operating speed of the induction motor and a voltage corresponding to the set speed. When the voltage corresponding to the operating speed is higher than that corresponding to the set speed, the control unit 31 provides a control signal to reduce the operating speed of the induction motor, and vice versa when the former voltage is lower than the latter voltage, and then the control motor 23 turns the second stator B according to the control signal provided by the control unit 31 to increase or decrease the displacement of the second stator B relative to the first stator A.

Upon the reception of a command signal to reduce the production rate of the system from the automatic control unit signal 28, the control unit 31 changes the operating speed of the induction motor accordingly.

In starting the induction motor, the working current decreases as the operating speed increases. Therefore, the displacement of the second stator B is varied gradually so that the induction motor is started in a predetermined starting mode. When the torque of the load is large and the induction motor is unable to accelerate, the displacement of the second stator B relative to the first stator A is decreased gradually so that the induction motor accelerates gradually.

When it is desired to change the operating speed of the induction motor during operation, a speed command signal is given to the control unit 31, and then the control unit 31 compares the speed command signal and the speed detection signal representing the operating speed of the induction motor to make the control motor 23 displace the second stator B to a position corresponding to an operating speed specified by the speed command signal.

In case the control means for controlling the second stator B, namely, the control motor 23 or the control circuit 31, fails to function properly, the second stator B can be turned by manually turning the output shaft 23a of the control motor 23.

Figure 8:
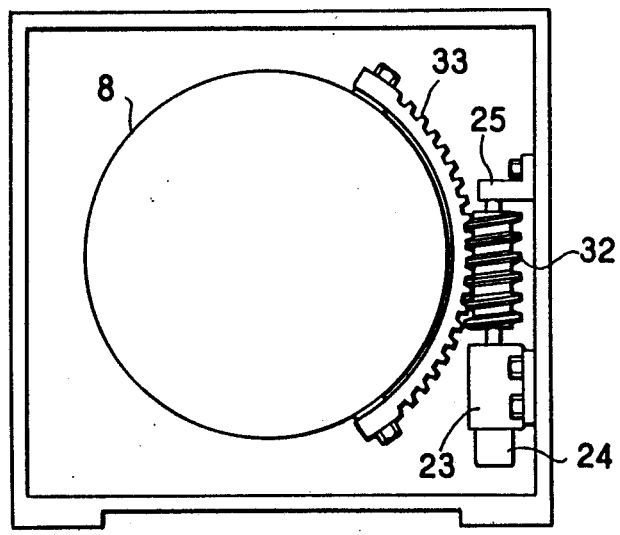
FIG. 8 is a front elevation of a modification of the gear mechanism of FIG. 7.

When a worm gear mechanism including a worm 32 and a segmental worm wheel 33 as shown in FIG. 8 is employed as the gear mechanism, the second stator B is restrained from free movement by the gear mechanism, and hence the brake device 24 may be omitted.

Although the induction motor in this embodiment is provided with a single combination of the gear mechanism and the control motor 23, the induction motor may be provided with a plurality of combinations each of the gear mechanism and the control motor 23 arranged at angular intervals on the circumference of the frame 9 of the induction motor, and the control motors 23 may be controlled synchronously.

As is apparent from the foregoing description, since the induction motor according to the present invention is provided with the movable second stator which is shifted through the gear mechanism by the control motor interlocked with the brake device, the second stator can easily and rapidly be displaced according to characteristics required by the load.

Furthermore, since the second stator can manually be turned for displacement in case the mechanism for shifting the second stator including the control motor and the control unit malfunctions, the induction motor can be incorporated into an automatic control system.

What is claimed is:

1. A squirrel-cage induction motor comprising;
   a frame;
   a squirrel-cage rotor rotatably supported on the frame;
   a first stator disposed around the squirrel-cage rotor within the frame and fixedly held on the frame; and
   a second stator having the same number of poles and slots as the first stator circumferentially movably within an angular range corresponding to one pole pitch of magnetic pole disposed around the squirrel-cage rotor within the frame beside the first stator with respect to the axial direction, stator being interlocked with a control motor through a gear mechanism including a segmental worm gear provided fixedly on the circumference of said second stator, and a worm meshing with the segmental worm gear is fixed to the output shaft of said control motor, and a control unit determines the direction and amount of angular displacement of the second stator on the basis of operating conditions required by the load and controls said control motor so as to turn the second stator accordingly.

2. A squirrel-cage induction motor comprising:
   a frame;
   a squirrel-cage rotor rotatably supported on the frame;
   a first stator disposed around the squirrel-cage rotor within the frame and fixedly held on the frame; and
   a second stator having same number of poles and slots as a first stator circumferentially movably within an angular range corresponding to one pole pitch of magnetic pole disposed around the squirrel-cage rotor within the frame beside the first stator with respect to the axial direction;
   characterized in that the second stator is interlocked with a braked control motor through a gear mechanism including a segmental gear fixedly extended on the circumference of the second stator, and a pinion fixed to the output shaft of the braked control motor and meshed with the segmental gear so as to be turned in circumferential directions, and a control unit determines the direction and amount of angular displacement of the second stator on the basis of operating conditions required by the load and controls the braked control motor so as to turn the second stator accordingly,
   wherein said control unit receives signals from
      a current detecting unit for detecting the working current of the squirrel-cage induction motor;
      a speed detecting unit for detecting the operating speed of the squirrel-cage induction motor;
      an automatic control unit for providing control signals representing the operating mode of a system incorporating the squirrel-cage induction motor;
      an operating condition setting unit for setting the operating conditions of the squirrel-cage induction motor; and
      a displacement detecting unit for measuring the displacement of said stator relative to said first stator.

3. A squirrel-cage induction motor according to claim 2, wherein holding rings are fixed to the outer circumference of said second stator, and the holding rings are received slidably respectively in guide rings fixed to the inner circumference of the frame so that said second stator can be turned together with the holding rings.

4. A squirrel-cage induction motor according to claim 2, wherein the second stator is interlocked with a plurality of braked control motors through a plurality of gear mechanisms each including a segmental gear fixedly extended on the circumference of the second stator, and a pinion fixed to the output shaft of the corresponding braked control motor and meshed with the segmental gear so as to be turned in circumferential directions, the plurality of gear mechanisms are arranged at angular intervals, and a control unit determines the direction and amount of angular displacement of the second stator on the basis of operating conditions required by the load and controls the respective braked control motors of the plurality of gear mechanisms synchronously so as to turn the second stator accordingly.

5. A squirrel-cage induction motor according to claim 2, wherein the output shaft of said braked control motor can manually be turned.

* * * * *